United States Patent
Takabayashi

(10) Patent No.: US 7,878,642 B2
(45) Date of Patent: Feb. 1, 2011

(54) IMAGE FORMING METHOD, ACTINIC RADIATION CURABLE INK-JET INK, AND INKJET RECORDING APPARATUS

(75) Inventor: Toshiyuki Takabayashi, Hachioji (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 911 days.

(21) Appl. No.: 11/792,269

(22) PCT Filed: Nov. 17, 2005

(86) PCT No.: PCT/JP2005/021079
§ 371 (c)(1),
(2), (4) Date: Jun. 4, 2007

(87) PCT Pub. No.: WO2006/061979
PCT Pub. Date: Jun. 15, 2006

(65) Prior Publication Data
US 2007/0257976 A1    Nov. 8, 2007

(30) Foreign Application Priority Data
Dec. 7, 2004    (JP) ............................... 2004-353848

(51) Int. Cl.
*G01D 11/00* (2006.01)
(52) U.S. Cl. .................................... 347/100; 347/102
(58) Field of Classification Search ............. 347/100, 347/95, 96, 101; 106/31.6, 31.27, 31.13; 523/160
See application file for complete search history.

(56) References Cited

U.S. PATENT DOCUMENTS 5,674,922 A * 10/1997 Igarashi et al. .............. 522/168
2002/0067394 A1   6/2002 Yoshihiro et al.

FOREIGN PATENT DOCUMENTS

| JP | 06-200204 A | 7/1994 |
| JP | 2002-060463 A | 2/2002 |
| JP | 2002-188025 A | 7/2002 |
| JP | 2002188025 | * 7/2002 |

(Continued)

OTHER PUBLICATIONS

U.S. Appl. No. 11/792,273, filed Jun. 4, 2007, Confirmation No. 3163.

*Primary Examiner*—Manish S Shah
(74) *Attorney, Agent, or Firm*—Holtz, Holtz, Goodman & Chick, P.C.

(57) ABSTRACT

A method of producing an image including the steps of: (a) ejecting droplets of at least two actinic radiation curable ink-jet inks from an ink-jet recording head so as to deposit onto a recording medium; and (b) irradiating the deposited droplets of the actinic radiation curable ink-jet inks with actinic radiations, wherein the two actinic radiation curable ink-jet inks being different in hue with each other; and an absolute value of $\Delta S(S_{low}-S_{high})$ is 5-1,000 mPa·s, where $S_{low}$ represents a viscosity of the actinic radiation curable ink-jet ink measured with a share rate of 11.7 l/s at 25° C., $S_{high}$ represents a viscosity of the actinic radiation curable ink-jet ink measured with a share rate of 1,000 l/s at 25° C., and $\Delta S(S_{low}-S_{high})$ represents a difference between the viscosities of $S_{low}$ and $S_{high}$.

7 Claims, 1 Drawing Sheet

FOREIGN PATENT DOCUMENTS

| | | | |
|---|---|---|---|
| JP | 2003-252979 A | 9/2003 | |
| JP | 2004-307613 A | 11/2004 | |
| JP | 2004-315565 A | 11/2004 | |
| JP | 2004-315685 A | 11/2004 | |
| JP | 2004-323610 A | 11/2004 | |
| JP | 2004323610 | * | 11/2004 |
| JP | 2005-255821 A | 9/2005 | |
| WO | WO 97/31071 A1 | 8/1997 | |
| WO | WO 03/074619 A1 | 9/2003 | |

* cited by examiner

IMAGE FORMING METHOD, ACTINIC RADIATION CURABLE INK-JET INK, AND INKJET RECORDING APPARATUS

This application is the United States national phase application of International Application PCT/JP2005/021079 filed Nov. 17, 2005.

TECHNICAL FIELD

The present invention relates to an image forming method and an ink-jet recording apparatus which employ an actinic radiation curable ink-jet ink capable of stably reproducing highly detailed images on various recording media, and an actinic radiation curable ink-jet ink used for the same.

BACKGROUND

In recent years, ink-jet recording systems, which enable simple formation of images at low cost, have been applied to various printing fields such as photography, various printing, and special printing such as marking and color filters. Specifically, by employing ink-jet recording apparatuses which eject minute dots of ink and control them, ink-jet inks which have been improved in color reproduction, durability, and ejection adaptability, and specialized paper media which have been enhanced in color forming properties of colorants and surface glossiness, it has become possible to achieve image quality comparable to conventional silver halide photography. Image quality of the present ink-jet recording systems is enhanced only when an ink-jet recording apparatus, an ink-jet ink and a specialized paper medium are simultaneously improved.

However, ink-jet systems which require specialized kinds of paper result in problems such that recording media are limited and using such recording media increases cost. Accordingly, many trials have been made in which recording, employing the ink-jet systems, is carried out on transfer media which differ from specialized kinds of paper. Specific systems include a phase-changing ink-jet system employing a wax ink which is solid at room temperature, a solvent based ink-jet system employing rapidly drying organic solvents as a main component, and an actinic radiation curable ink-jet system in which, after recording, actinic radiation such as ultraviolet radiation (UV radiation) is exposed onto the deposited ink to result in crosslinking.

Of these, the UV radiation curable ink-jet system has received most attention in recent years, since it results in relatively low unpleasant odor, compared to a solvent based ink-jet system, exhibits rapid drying, and enables recording on non-ink absorptive recording media. Several methods employing the above UV radiation curable ink-jet ink are disclosed (refer, for example, to Patent Documents 1-5). However, when these UV radiation curable ink-jet inks are employed, the diameter of dots of each of the colors is subjected to a large change, due to the time lag from the deposition of each of the colored inks, employing different colorants, to curing, resulting in problem of the degradation of image quality.

For example, disclosed as an image quality enhancing technique is a method in which the viscosity, surface tension and photographic speed are regulated for each of the colored inks (refer, for example, to Patent Document 6). However, in particular, when the viscosity and surface tension are changed for each type of colored ink, the ejection stability of each ink differs markedly, whereby it has been not possible to stably form images.

(Patent Document 1) Japanese Patent Publication Open to Public Inspection (hereinafter referred to as JP-A) No. 6-200204
(Patent Document 2) Japanese Patent Publication Open to Public Inspection (under PCT Application) No. 2000-504778
(Patent Document 3) JP-A No. 2002-188025
(Patent Document 4) JP-A No. 2002-60463
(Patent Document 5) JP-A No. 2003-252979
(Patent Document 6) WO-03/No. 074619 Pamphlet

DISCLOSURE OF THE INVENTION

Problems to be Solved by the Invention

In view of the above problems, the present invention was realized. An object of the present invention is to provide an image forming method which results in excellent text quality, minimizes color mixing (bleeding), and enables stable recording of highly detailed images under targeted reproduction, an actinic radiation curable ink-jet ink employed in the above method, and an ink-jet recording apparatus.

Means to Solve the Problems

The above object of the present invention enables achievement via the following embodiments.

1. In an image forming method in which at least two types of actinic radiation curable ink-jet inks, which differ in hue, are ejected from an ink-jet recording head onto a recording medium, and printing is conducted on the aforesaid recording medium, an image forming method wherein an absolute value of a difference of $\Delta S(S_{low}-S_{high})$ between the two ink-jet inks different in hue is 5-1,000 mPa·s, where $S_{low}$ represents a viscosity of the aforesaid actinic radiation curable ink-jet ink measured with a share rate of 11.7 l/s at 25° C., $S_{high}$ represents a viscosity of the same measured with a share rate of 1,000 l/s at 25° C., and $\Delta S(S_{low}-S_{high})$ represents a difference between the above viscosities.

2. The image forming method, described in the aforesaid item 1, wherein after sequentially depositing all of the aforesaid at least two types of actinic radiation curable inks onto the aforesaid recording medium, exposure to actinic radiation is conducted.

3. The image forming method, described in the aforesaid item 1 or 2, wherein of the aforesaid at least two types of actinic radiation curable ink-jet inks which differ in hue, $\Delta S$ of the actinic radiation curable ink-jet ink which is initially ejected and deposited onto a recording medium, is greater than $\Delta S$ of the same which is ejected and deposited onto the recording medium after the initial ink-jet ink.

4. The image forming method, described in any one of the aforesaid items 1-3, wherein a difference $\Delta S_{high}$ between viscosities ($S_{high}$) measured with a share rate of 1,000 l/s of the two actinic radiation curable ink-jet inks, which differ in hue, is 0-10 mPa·s.

5. The image forming method, described in any one of the aforesaid items 1-4, wherein a volume of at least two actinic radiation curable ink-jet ink droplets differing in hue, which are ejected from each nozzle of the aforesaid ink-jet recording head, is 2-15 pl.

6. In an actinic radiation curable ink-jet ink, which is employed in the image forming method described in any one of the aforesaid items 1-5, the actinic radiation curable ink-jet ink incorporating at least one compound having an oxirane group as a photopolymerizable compound.

7. In an actinic radiation curable ink-jet ink, which is employed in the image forming method described in any one of the aforesaid items 1-5, the actinic radiation curable ink-jet ink incorporating at least one compound having an oxetane ring in an amount of 30-90% by weight, at least one compound having a oxirane group in an amount of 5-70% by weight, and at least one vinyl ether compound in an amount of 0-40% by weight.

8. In an ink-jet recording apparatus employed in the image forming method, described in any one of the aforesaid items 1-5, an ink-jet recording apparatus exhibiting the function in which after heating an actinic radiation curable ink-jet ink and the recording head at 35-100° C., the aforesaid actinic radiation curable ink-jet ink is ejected.

EFFECTS OF THE INVENTION

According to the present, it is possible to provide an image forming method which results in excellent text quality, minimizes color mixing (bleeding), and enables stable recording of highly detailed images under targeted reproduction without using specialized recording media, an actinic radiation curable ink-jet ink employed in the above method, and an ink-jet recording apparatus.

Figure 1:
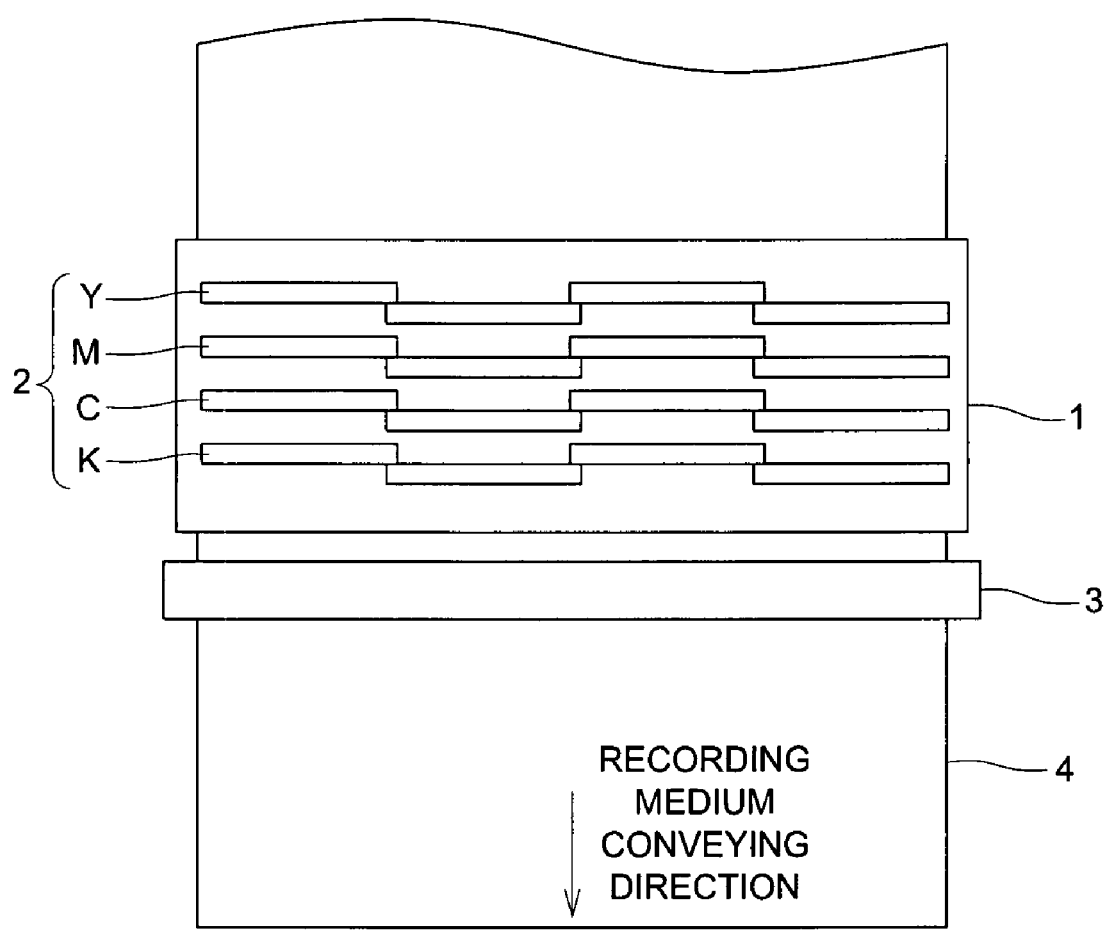
FIG. 1 is a sectional view showing one example of the ink-jet recording apparatus employed to form images of the present invention.

DESCRIPTION OF THE NUMBERS 1 carriage (light shielding)
2 recording heads (Y, M, C, and K)
3 exposure device (lamp unit)
4 recording medium

BEST MODE FOR CARRYING OUT THE INVENTION

In view of the above problems, the inventors of the present invention conducted diligent investigation. As a result, the following image forming method was realized and the present invention was achieved. In an image forming method in which at least two types of actinic radiation curable ink-jet inks, which differ in hue, are ejected from an ink-jet recording head onto a recording medium, and printing is conducted on the aforesaid recording medium, by employing an image forming method characterized in that the absolute value of a difference of $\Delta S(S_{low}-S_{high})$ between the two ink-jet inks different in hue is 5-1,000 mPa·s, wherein $S_{low}$ represents the viscosity of the aforesaid actinic radiation curable ink-jet ink measured with a share rate of 11.7 l/s at 25° C., $S_{high}$ represents the viscosity of the same measured with a share rate of 1,000 l/s at 25° C., and $\Delta S(S_{low}-S_{high})$ represents the difference between the above viscosities. It is possible to realize an image forming method which results in excellent character quality, minimizes color mixing (bleeding), and enables stable recording of highly detailed images under targeted reproduction.

As described above, it is known that when a conventional actinic radiation curable ink-jet ink (hereinafter also simply referred to as an ink) is employed, image quality is enhanced by changing the viscosity, surface tension, and photographic speed of each of the inks differing in hue. Examples include techniques in which the viscosity of an ink which is initially ejected is set to be higher than that of the ink which is ejected after the first ink so that the first ink droplets, deposited onto a recording medium, hardly result in bleeding on the above recording medium, and the surface tension of an ink which is initially ejected is set to be higher than that of the ink which is ejected after the first ink so that the first ink droplets, deposited onto a recording medium, hardly result in bleeding on the above recording medium. The inventors of the present invention practiced the above techniques and discovered that when the viscosity and the surface tension of ink of each color were changed, ejection of each colored ink became very unstable (even though driving conditions of the recording head were changed, a limit resulted), resulting in unacceptable image quality. Specifically, under conditions in which the volume of an ink droplet was small as 2-15 pl, it was noticed that, along with degradation of discharging properties, image quality was markedly deteriorated.

The inventors of the present invention conducted diligent investigation and discovered that by forming images employing at least two types of actinic radiation curable ink-jet inks differing in hue, which satisfied the above conditions specified in the present invention, the targeted effects of the present invention were achieved and in the aspect of the ejection stability, more preferable effects were realized.

Further, in the present invention, by employing the cationically photopolymerizable actinic radiation curable ink-jet ink in which epoxy compounds and/or oxetane compounds were employed as a photopolymerizable compound, it was discovered that it was possible to stabilize ejection properties more and to form highly detailed images.

The present invention will now be detailed.

The viscosity in the present invention refers to a value determined via viscoelasticity meter MCR300 produced by Physica Co. It is characterized that the absolute value of a difference of $\Delta S(S_{low}-S_{high})$ between the two ink-jet inks different in hue is 5-1,000 mPa·s, wherein $S_{low}$ represents the viscosity of an actinic radiation curable ink-jet ink of a share rate of 11.7 l/s at 25° C., $S_{high}$ represents the viscosity of the same of a share rate of 1,000 l/s at 25° C., and $\Delta S(S_{low}-S_{high})$ represents the difference between the two viscosities. When the absolute value of a difference of $\Delta S(S_{low}-S_{high})$ between the two ink-jet inks different in hue is at least 5 mPa·s, excellent effects of enhanced image quality result, while when the absolute value of a difference of $\Delta S(S_{low}-S_{high})$ between the two ink-jet inks different in hue is at most 1,000 mPa·s, excellent storage stability of the ink results. The above $\Delta S$ is more preferably 5-500 mPa·s.

Further, in the present invention, difference $\Delta S_{high}$ of viscosity ($S_{high}$) of a share rate of 1,000 l/s at 25° C. of at least two types of actinic radiation curable ink-jet inks is preferably 0-10 mPa·s. When $\Delta S_{high}$ exceeds 10 mPa·s, ejection properties among colors become unstable, resulting in degradation of image quality.

Further, in the image forming method of the present invention, conditions are preferably set so that, of at least two types of actinic radiation curable ink-jet inks, $\Delta S$ of the actinic radiation curable ink-jet ink which is initially ejected and deposited onto a recording medium is greater than that of the radiation curable ink-jet ink which is ejected after the initial ink.

Still further, the most preferred embodiment in the image forming method of the present invention is as follows. Images are formed employing a method in which $\Delta S_{high}$ is almost negligible of at least two types of actinic radiation curable ink-jet inks which differ in hue, and ΔS of the initially ejected ink is largest and ΔS of the sequential inks which are ejected after the first ink decreases in steps of 5-100 mPa·s.

With regard to at least two types of actinic radiation curable ink jet inks which differ in hue, according to the present invention, methods to realize viscoelastic characteristics specified in the present invention are not particularly limited. It is possible to appropriately control them via selection of the types of pigments and dispersing agents, and the dispersion conditions, or via the use of high-boiling point low viscosity solvents.

In the present invention, in order to enhance curability and ejection stability, it is preferable that at least one compound having an oxirane group is incorporated.

Employed as a cationically photopolymerizable monomer may be various cationically polymerizable monomers known in the art. Examples include epoxy compounds, vinyl ether compounds, and oxetane compounds exemplified in JP-A Nos. 6-9714, 2001-31892, 2001-40068, 2001-55507, 2001-310938, 2001-310937, and 2001-220526.

The epoxy compounds applicable to the present invention include the following aromatic epoxides, alicyclic epoxides, and aliphatic epoxides Preferred examples of the aromatic epoxide include diglycidyl ether or polyglycidyl ether prepared by allowing polyphenol having at least one aromatic nucleus, or the alkylene oxide adducts thereof to react with epichlorohydrin. Examples include diglycidyl ether or polyglycidyl ether of bisphenol A or alkylene oxides thereof, diglycidyl ether or polyglycidyl ether of hydrogenated bisphenol A or alkylene oxides thereof, and novolac epoxy resins. Examples of the alkylene oxides include ethylene oxide and propylene oxide.

An alicyclic epoxide is prepared by epoxidizing a compound having at least one cycloalkene ring, such as cyclohexene or cyclopentane, by using an appropriate oxidant such as hydrogen peroxide or peracids. Preferred examples of the alicyclic epoxides include cyclohexene oxide and cyclopentene oxide.

Preferred examples of the aliphatic epoxides include diglycidyl ether or polyglycidyl ether of an aliphatic polyalcohol or alkylene oxides thereof. Typical examples include diglycidyl ether of an alkylene glycol (for example, diglycidyl ether of ethylene glycol, propylene glycol, or 1,6-hexanediol), polyglycidyl ether of polyalcohol (for example, diglycidyl ether or triglycidyl ether of glycerin or alkylene oxides thereof), and diglycidyl ether of polyalkylene glycol (for example, diglycidyl ether of polyethylene glycol or alkylene oxides thereof, or polypropylene glycol or alkylene oxides thereof). Examples of the alkylene oxide include ethylene oxide and propylene oxide.

Of these epoxides, aromatic and alicyclic oxides are preferable from the viewpoint of curing rate, but the alicyclic oxides are specifically preferable. According to the present invention, the above oxides may be used individually or in combination.

Further, according to the present invention, from the viewpoint of safety, it is specifically preferable to use at least either of an epoxidized fatty acid ester or an epoxidized fatty acid glyceride as an epoxide having an oxirane ring. Any of epoxidized fatty acid eaters and epoxidized fatty acid glycerides, into which an epoxy group is introduced, may be employed without limitation.

Examples of the epoxidized fatty acid ester, prepared by epoxidizing an oleate, include epoxymethyl stearate, epoxybutyl stearate, and epoxyoctyl stearate. Further, examples of the epoxidized fatty acid glyceride prepared by epoxidizing soybean oil, linseed oil, or castor oil include epoxidized soybean oil, epoxidized linseed oil, and epoxidized castor oil.

In the present invention, to increase ejection stability, it is preferable to contain, as a photopolymerizable compound, 30-95% by weight of a compound having an oxetane ring, 5-70% by weight of a compound having an oxirane group, and 0-40% by weight of a vinyl ether compound (with respect to 100% by weight of the total photopolymerizable compounds, respectively).

Any of oxetane compounds known in the art, described in JP-A Nos. 2001-220526 and 2001-310937, may be used in the present invention.

Examples of vinyl ether compounds usable in the present invention include di- or trivinyl ether compounds such as ethylene glycol divinyl ether, diethylene glycol divinyl ether, triethylene glycol divinyl ether, propylene glycol divinyl ether, dipropylene glycol divinyl ether, butanediol divinyl ether, hexanediol divinyl ether, cyclohexane dimethanol divinyl ether, or trimethylol propane trivinyl ether, as well as monovinyl ether compounds such as ethyl vinyl ether, butyl vinyl ether, i-butyl vinyl ether, octadecyl vinyl ether, cyclohexyl vinyl ether, hydroxybutyl vinyl ether, 2-ethylhexyl vinyl ether, cyclohexane dimethanol monovinyl ether, propyl vinyl ether, i-propyl vinyl ether, i-propenyl ether-o-propylene carbonate, dodecyl vinyl ether, diethylene glycol monovinyl ether, or octadecyl vinyl ether.

From the viewpoint of curability, adhesiveness, and surface hardness, preferred are these vinyl ether compounds such as di- or trivinyl ether compounds, but trivinyl ether compounds are specifically preferable. The above vinyl ether compounds according to the present invention may be used individually or in combination.

Further, radically polymerizable compounds may also be used in the present invention. Any of the (meth)acrylate monomers and oligomers known in the art may be used as a radically polymerizable compound. Examples include monofunctional monomers such as i-amyl acrylate, stearyl acrylate, lauryl acrylate, octyl acrylate, decyl acrylate, i-myristyl acrylate, i-stearyl acrylate, 2-ethylhexyl-diglycol acrylate, 2-hydroxybutyl acrylate, 2-acryloxyethyl hexahydrophthalate, butoxyethyl acrylate, ethoxy diethylene glycol acrylate, methoxy diethylene glycol acrylate, methoxy polyethylene glycol acrylate, methoxy propylene glycol acrylate, phenoxy ethyl acrylate, tetrahydrofurfuryl acrylate, i-bornyl acrylate, 2-hydroxyethyl acrylate, 2-hydroxypropyl acrylate, 2-hydroxy-3-phenoxypropyl acrylate, 2-acryloxyethyl succinate, 2-acryloxyethyl phthalate, 2-acryloxyethyl-2-hydroxyethyl phthalate, lactone-modified flexible acrylate, or t-butylcyclohexyl acrylate; bifunctional monomers such as triethylene glycol diacrylate, tetraethylene glycol diacrylate, polyethylene glycol diacrylate, tripropylene glycol diacrylate, polypropylene glycol diacrylate, 1,4-butanediol diacrylate, 1,6-hexanediol diacrylate, 1,9-nonanediol diacrylate, neopentyl glycol diacrylate, dimethylol-tricyclodecane diacrylate, bisphenol A EO (ethylene oxy) adduct diacrylate, bisphenol A PO (propylene oxy) adduct diacrylate, neopentylglycol hydroxypivalate diacrylate, or polytetramethylene glycol diacrylate; and tri- or multifunctional monomers such as trimethylolpropane triacrylate, EO-modified trimethylolpropane triacrylate, pentaerythritol triacrylate, pentaerythritol tetraacrylate, dipentaerythritol hexaacrylate, ditrimethylolpropane tetraacrylate, glycerol propoxytriacrylate, caprolactone modified trimethylolpropane triacrylate, pentaerythritol ethoxytetraacrylate, or caprolactam-modified dipentaerythritol hexaacrylate.

Any of the photolytically acid generating agents known in the art may be used as a photopolymerization initiator to prepare actinic light curable inkjet inks according to the present invention. Compounds, for example, used as chemically sensitized photoresists, or in cationic photopolymerization may be available as a photolytically acid generating agent (Refer to pages 187 to 192 of Imaging Yo Yuki Zairyo (Organic Materials Used for Imaging) edited by Yuki Electronics Zairyo Kenkyukai published by Bunshin Shuppan (1993).

Preferable examples according to the present invention will now be listed below.

Firstly listed may be examples include $B(C_6F_5)_4^-$, $PF_6^-$, $AsF_6^-$, $SbF_6^-$, and $CF_3SO_3^-$ salts of aromatic onium compounds such as diazonium, ammonium, iodonium, sulfonium, and phosphonium. Specific examples of the available onium compounds will now be listed below.

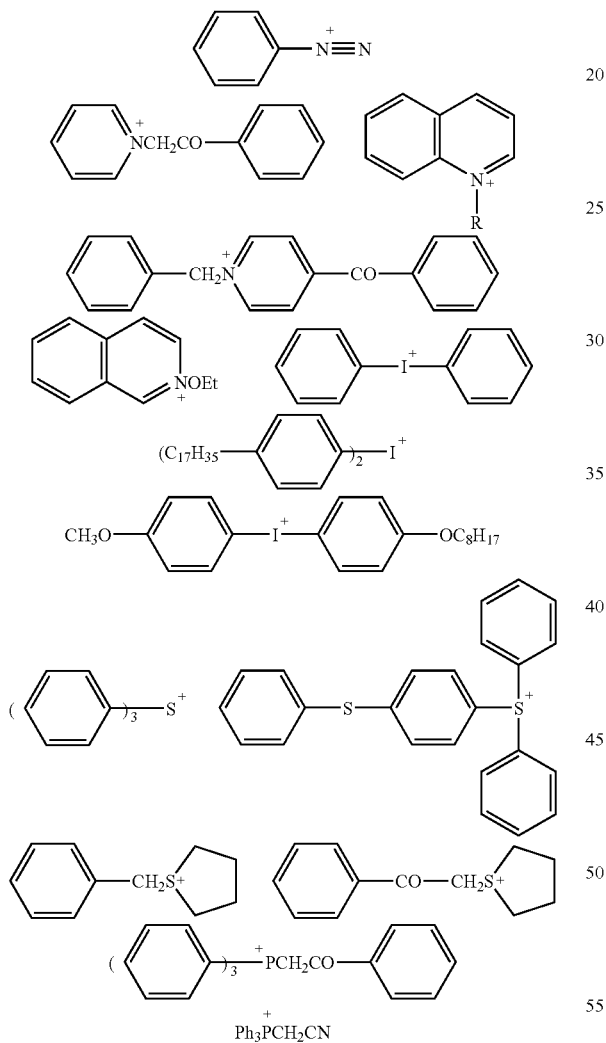

Secondly, sulfone compounds capable of generating sulfonic acid are applicable, specific examples of which will now be listed.

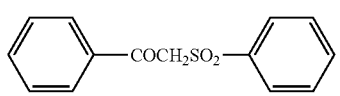

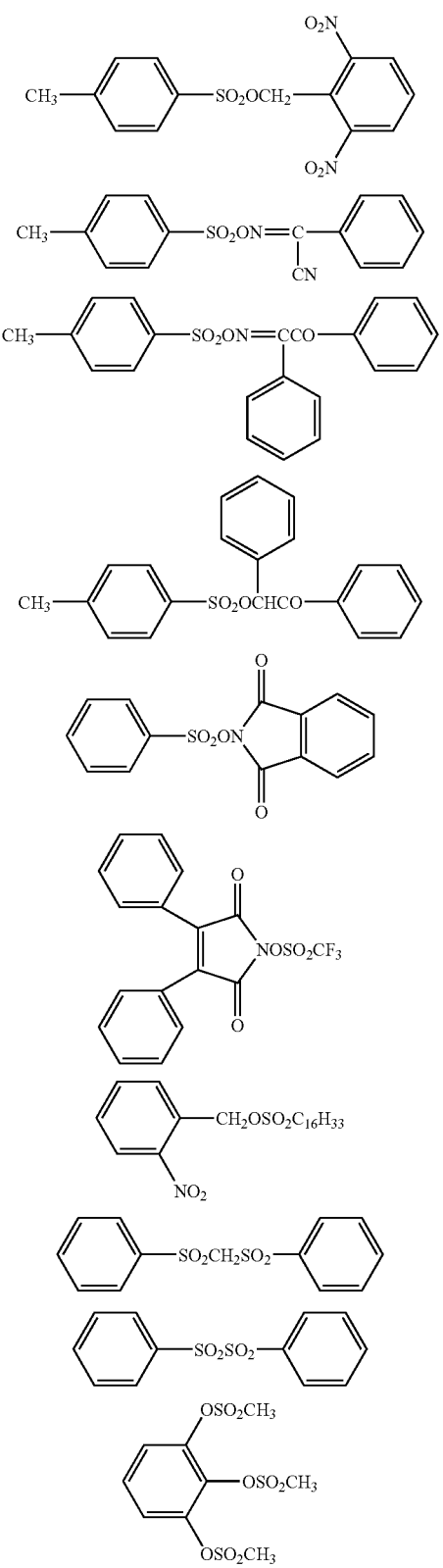

Thirdly, halogen compounds which photolytically generate hydrogen halides are applicable. Specific examples will now be listed.

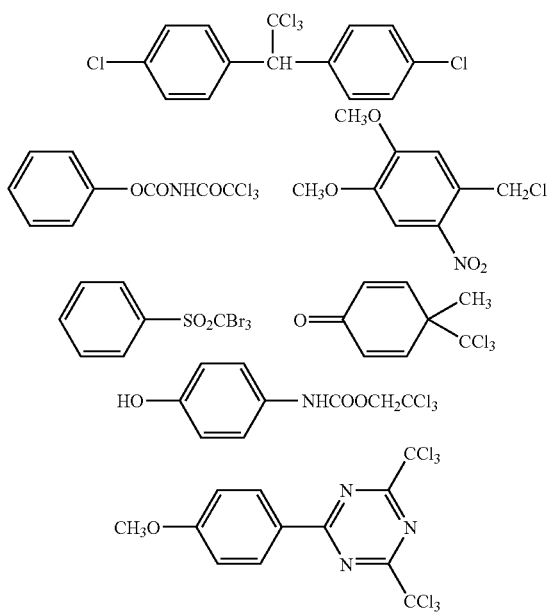

Fourthly, cited may be arene complexes are applicable. Specific examples will now be listed.

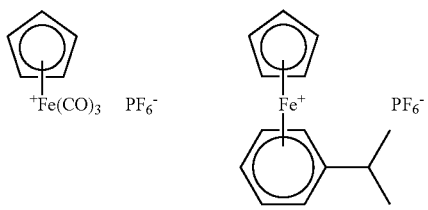

Photolytically radical generating agents may also be used as a photopolymerization initiator. Examples include compounds known in the art, such as aryl alkyl ketones, ketone oximes, S-phenyl thiobenzoate, titanocene, aromatic ketones, thioxanthone, derivatives formed by combining a quinone with a benzyl group, and ketocoumalins. These compounds are detailed in "UV.EV Kokagijutu no Oyo to Shijo," edited by Rad Tec Kenkyukai under the editorship of Yoneho Tabata, published by CMC Shuppan. Of these, acylphosphine oxides and acylphosphonates are specifically effective for inner curing of ink images at a thickness of 5-12 μm per color recorded in such a manner as an ink-jet method, since these compounds are highly sensitive and decrease absorption due to photo-cleavage induced by initiators. Bis(2,4,6-trimethylbenzoyl)-phenylphosphine oxide, and bis(2,6-dimethoxybenzoyl)-2,4,4-trimethylpentylphosphine oxide are specifically preferable; however, from the viewpoint of safety, preferred examples include 1-hydroxycyclohexyl-phenylketone, 2-methyl-1-[4-(methylthio)phenyl]-2-morpholinopropan-1-one, bis(2,6-dimethoxybenzoyl)-2,4,4-trimethylpentylphosphin oxide, and 2-hydroxy-2-methyl-1-phenylpropane-1-one (DALOCURE 1173, trade name, manufactured by Merck KGaA).

The added amount of photopolymerization initiators is commonly 1-6% by weight of the total ink composition, but is preferably 2-5% by weight.

Pigments are preferably used as a colorant for preparing the ink according to the present invention. Specific examples will now be listed; however, the present invention is not limited thereto.

C.I. Pigment Yellow-1, 2, 3, 12, 13, 14, 16, 17, 73, 74, 75, 81, 83, 87, 93, 95, 97, 98, 109, 114, 120, 128, 129, 138, 151, 154, and 180;

C.I. Pigment Red-5, 7, 12, 22, 38, 48:1, 48:2, 48:4, 49:1, 53:1, 57:1, 63:1, 101, 112, 122, 123, 144, 146, 168, 184, 185, and 202;

C.I. Pigment Violet-19 and 23;

C.I. Pigment Blue-1, 2, 3, 15:1, 15:2, 15:3, 15:4, 18, 22, 27, 29, and 60;

C.I. Pigment Green-7 and 36;

C.I. Pigment White-6, 18, and 21; and

C.I. Pigment Black-7

If desired, pigments may undergo various surface treatments known in the art.

During dispersion of pigments, it is preferable to employ dispersing agents. Employed as such dispersing agents may be any of those of a low or high molecular weight, but those of a high molecular weight are preferred. Specific examples of preferred dispersing agents include, but are not limited to, AJISPER PB824, AJISPER PB822, and AJISPER PB821, all produced by Ajinomoto Fine Techno Co., and HINOACT KF-1300M, KF-1700, and T-6000, produced by Kawaken Fine Chemicals Co., Ltd.

Examples of dispersing apparatuses employable to disperse pigments include a ball mill, a sand mill, an attritor, a roller mill, an agitator, a Henschel mixer, a colloidal mill, an ultrasonic homogenizer, a pearl mill, a wet system jet mill, and a paint shaker. Further, if necessary, it is possible to employ synergists corresponding to each of the pigments. The added amount of these dispersing agents and dispersing aids is preferably 1-50 parts by weight with respect to 100 parts by weight of the pigments. Solvents or polymerizable compounds are employed as a dispersion medium. However, the actinic radiation curable ink employed in the present invention undergoes reaction and curing just after deposition of ink droplets, whereby it is preferable that no solvent is employed. When solvents remain in cured images, problems of degradation of solvent resistance and VOC (volatile organic compound) of residual solvents occur. Consequently, in view of dispersion adaptability, instead of solvents, it is preferable to select, as a dispersion medium, polymerizable compounds, especially monomers at the lowest viscosity of those.

Examples of high-boiling point low viscosity solvents, which are employed to regulate viscosity in the present invention, include glycol ether compounds, and any of the appropriate ones, which are commercially available, may be employed. Specific examples include "the HIGH SOLVE SERIES" marketed by TOHO Chemical Industry Co., Ltd. Further, the boiling point of the glycol ether compounds is preferably 200-350° C. When glycol compounds, at a boiling point of less than 200° C., are incorporated in ink, ejection tends to become unstable. On the other hand, glycol ether compounds at a boiling point exceeding 350° C. often exhibit high viscosity, whereby the resulting ink exhibits high viscosity. Accordingly, neither of them is preferred as ink.

The image forming method of the present invention will now be described.

In the image forming method of the present invention, a method is preferred in which the above actinic radiation curable ink-jet ink is ejected onto recording media to create images, and subsequently, actinic radiation such as ultraviolet radiation is exposed to the images to cure the ink.

(Exposure Timing of Actinic Radiation)

In the image forming method of the present invention, in view of more effectively realizing the targeted effects, it is preferable that after sequentially depositing ink droplets onto the aforesaid recording media, actinic radiation is exposed. Namely, in the image forming method of the present invention, in which at least two actinic radiation curable ink-jet inks, of differing in hue, are ejected onto the recording media, it is preferable that after deposition of initial colored ink droplets onto the recording medium, all the inks following the first colored ink are ejected at a predetermined volume, and after the above deposition, actinic radiation is then exposed in a lump.

(Ink Ejection Conditions)

In view of ejection stability, ink ejection conditions are preferred in which, after heating the recording head and the ink at 35-100° C., the ink is ejected. Actinic radiation curable ink-jet ink results in a wide variation range of viscosity due to temperature changes. Viscosity variation directly and significantly affects the size of droplets and the droplet ejection rate to result in degradation of image quality. Consequently, while elevating temperature, it is necessary to maintain the temperature at a constant value. The controlling range of the ink temperature is commonly within a predetermined temperature ±5° C., is preferably within a predetermined temperature ±2° C., but is more preferably within a predetermined temperature ±1° C.

Further, in the present invention, the volume of an ink droplet ejected from the nozzle of each ink-jet recording head is preferably 2-15 pl. Fundamentally, in order to form highly detailed images, the volume of an ink droplet is required to be within the above range. However, when ejection is conducted at the above ink droplet volume, ejection stability is further required. According to the present invention, even though ejection is conducted at a small droplet volume as 2-15 µl, ejection stability is enhanced, whereby it is possible to stably form highly detailed images.

(Exposure Conditions after Deposition of Ink Droplets)

In the image forming method of the present invention, as actinic radiation exposure conditions, the actinic radiation is exposed preferably 0.001-1.0 second after deposition of ink droplets, but is more preferably exposed after 0.001-0.8 second. In order to form highly detailed images, it is particularly important that exposure timing is as early as possible.

Basic methods of actinic radiation exposure methods are disclosed in JP-A No. 60-132767. Based on that, radiation sources are arranged on both sides of the head unit, and the head and the radiation source are scanned via a shuttle system. Exposure is conducted within a specified period after deposition of ink droplets. Further, curing is completed via another radiation source which is not driven. U.S. Pat. No. 145,979 discloses, as an exposure method, one which employs optical fibers and another in which UV radiation is exposed to a recording section via hitting collimated radiation onto a mirror surface provided on the side of the unit. In the image forming method of the present invention, either of these exposure methods may be usable.

Further, the following method is one of the preferred embodiments. Actinic radiation exposure is divided into two stages. Initially, actinic radiation is exposed within 0.001-2 seconds after deposition of ink droplets, and after complete printing, actinic radiation is further exposed. By dividing actinic radiation exposure into two stages, it is possible to retard contraction of the recording material, which occurs during ink curing.

Heretofore, in UV ink-jet systems, it has been common that a high illuminance radiation source, which consumes a total power of at least 1 kW·hour, is employed to retard dot widening and bleeding after deposition of ink droplets. However, when such a radiation source is employed, particularly in shrink-label printing, the contraction of recording materials is too large, whereby it has been impossible to employ the above radiation source.

In the present invention, even though a radiation source which consumes the total power of at most 1 kW·hour, is employed, it is possible to form highly detailed images and to control the contraction of recording materials within practical levels. Examples of radiation sources, which consume less than 1 kW hour, include fluorescent lamps, cold-cathode tubes and LEDs, however, the present invention is not limited thereto.

(Ink-Jet Recording Apparatus)

The ink-jet recording apparatus (hereinafter referred to simply as the recording apparatus) of the present invention will now be described while referring to the drawing. The recording apparatus in the drawing is one embodiment of the present inventions, but the recording apparatus of the present invention is not limited to thereto.

FIG. 1 is a top view showing one example of the structure of the main section of an ink-jet recording apparatus. The above recording apparatus is called a line head system, and a plurality of ink-jet recording heads 2 of each color is fixed to head carriage 1 to cover the entire width of recording medium P. Recording head 2 ejections an actinic radiation curable ink (for example, a UV ink) supplied by an ink supplying means (not shown) from the orifices onto recording medium 4 via operation of a plurality of ejection means arranged in the interior.

Exposure means 3 is arranged to cover the entire ink printing area in such a manner that the entire width of printing medium 4 is covered, in the same manner as above, at the rear of carriage 1 downstream of carriage 1, namely in the recording medium 4 conveying direction. Exposure means 3 is composed of ultraviolet lamps, which emit ultraviolet radiation at a stable exposure energy, and filters which transmit ultraviolet radiation of the specified wavelength. Usable ultraviolet lamps include mercury lamps, metal halide lamps, excimer lasers, ultraviolet lasers, cold-cathode tubes, blacklights, and LEDs (light emitting diodes). Of these, preferred are band shaped metal halide lamps, cold-cathode tubes, or backlights. Particularly preferred are low pressure mercury lamps which emit ultraviolet radiation of 254 nm wavelength, cold-cathode tubes, hot-cathode tubes, and sterilization lamps, due to their low power consumption. In the recording apparatus employed in the present invention, 6 low pressure mercury lamps were arranged in the lateral direction with respect to the recording medium conveying direction, while realizing an exposure width of 12 cm.

In this line head system, head carriage 1 and exposure means 3 are fixed, while only recording medium P is conveyed. After ejection and deposition of all color inks, photocuring is collectively conducted to form images. The ink of the present invention exhibits excellent ejection stability, whereby the above ink is particularly effective when images are formed employing a line head type recording apparatus.

Usable recording media include various non-absorptive plastics and film thereof employed for so-called soft packaging, other than common non-coated paper and coated paper. Examples of various plastic films include PET (polyethylene terephthalate), OPS (oriented polystyrene), OPP (oriented polypropylene), ONy (oriented nylon), PVC (polyvinyl chloride), PE (polyethylene), and TAC (cellulose triacetate) films. Other usable plastics include PC (polycarbonate), acrylic resins, ABS, polyacetal, PVA (polyvinyl alcohol), rubber. Further, metals and glass are applicable.

Of these recording media, when images are formed on PET films, OPS films, OPP films, ONy films, and PVC films, which are heat-shrinkable, the embodiments of the present invention are effective. Reasons for this are that these substrates tend to result in curling and modification due to contraction during ink curing and heat generation during curing reaction, and the resulting ink layer hardly follows contraction of the substrate.

The surface energy of these various types of plastic films differs significantly. Consequently, problems have resulted in which the ink dot diameter varies markedly after deposition. However, based on the embodiments of the present invention, it is possible to form excellent highly detailed images on recording media exhibiting a wide range of surface energy of 35-60 mN/m, such as OPP film and OPS film exhibiting relatively low surface energy, and PET film which exhibits a relatively high surface energy.

In the present invention, in view of recording medium cost such as packaging expense and production cost, production efficiency of prints, and capability corresponding to various print sizes, it is more advantageous to employ long-length (web) recording media.

EXAMPLES

The present invention will now be specifically described with reference to examples; however, present invention is not limited thereto.

Example 1

Preparation of Pigment Dispersion Set

Pigment Dispersion Sets A-E were prepared each of which was composed of a yellow pigment dispersion (hereinafter referred to as Y Pigment), a magenta pigment dispersion (hereinafter referred to as M Pigment), a cyan pigment dispersion (hereinafter referred to as C Pigment), and a black pigment dispersion (hereinafter referred to as K Pigment), each of which was formulated as described in Table 1.

In practice, placed in a stainless steel beaker were the dispersing agent and the monomer described in Table 1, and dissolution was conducted for one hour on a hot plate at 65° C., while heated and stirred. Subsequently, after cooling the solution to room temperature, 20 parts of the pigment described in Table 1 were added. The resulting mixture was sealed in a glass bottle together with 0.5 mm zirconia beads and dispersed over the period listed in Table 1, employing a paint shaker. Thereafter, the zirconia beads were removed, whereby each of the color pigment dispersions was prepared.

TABLE 1

| | | Y Pigment | | M Pigment | | C Pigment | | K Pigment |
|---|---|---|---|---|---|---|---|---|
| | | | | Dispersion A | | | | |
| Dispersing Agent | D1 | 8** | D1 | 8** | D1 | 8** | D1 | 8** |
| Monomer | MO1 | 72** | MO1 | 72** | MO1 | 72** | MO1 | 72** |
| Pigment | Y1 | 20** | M2 | 20** | C1 | 20** | K1 | 20** |
| Processing Time | | 10 hr | | 10 hr | | 10 hr | | 12 hr |
| | | | | Dispersion B | | | | |
| Dispersing Agent | D5 | 8** | D7 | 8** | D1 | 8** | D2 | 8** |
| Monomer | MO1 | 72** | MO1 | 72** | MO1 | 72** | MO1 | 72** |
| Pigment | Y1 | 20** | M2 | 20** | C1 | 20** | K1 | 20** |
| Processing Time | | 10 hr | | 10 hr | | 6 hr | | 12 hr |
| | | | | Dispersion C | | | | |
| Dispersing Agent | D6 | 8** | D3 | 8** | D3 | 8** | D8 | 8** |
| Monomer | MO2 | 72** | MO2 | 72** | MO2 | 72** | MO2 | 72** |
| Pigment | Y2 | 20** | M1 | 20** | C2 | 20** | K2 | 20** |
| Processing Time | | 10 hr | | 10 hr | | 6 hr | | 12 hr |
| | | | | Dispersion D | | | | |
| Dispersing Agent | D6 | 8** | D3 | 8** | D3 | 8** | D8 | 8** |
| Monomer | MO2 | 72** | MO2 | 72** | MO2 | 72** | MO2 | 72** |
| Pigment | Y2 | 20** | M1 | 20** | C2 | 20** | K2 | 20** |
| Processing Time | | 10 hr | | 8 hr | | 6 hr | | 12 hr |
| | | | | Dispersion E | | | | |
| Dispersing Agent | D7 | 8** | D1 | 8** | D4 | 8** | D8 | 8** |
| Monomer | MO2 | 72** | MO2 | 72** | MO2 | 72** | MO2 | 72** |
| Pigment | Y3 | 20** | M3 | 20** | C2 | 20** | K2 | 20** |
| Processing Time | | 10 hr | | 12 hr | | 6 hr | | 12 hr |

**parts

Pigments, dispersing agents, and monomers (dispersion solvents) abbreviated in Table 1 are detailed below.

(Pigments)

Y1: Pigment Yellow 120 (HOSTAPERM YELLOW H2G, produced by Clariant Co.)

Y2: Pigment Yellow 180 (PV FAST YELLOW HG01, produced by Clariant Co.)

Y3: Pigment Yellow 138 (customized product, produced by Dainichiseika Color & Chemicals Mfg. Co., Ltd.)

M1: Pigment Red 122 (customized product, produced by Dainichiseika Color & Chemicals Mfg. Co., Ltd.)

M2: Pigment Red 122 (PV FAST PINK E, produced by Clariant Co.)

M3: Pigment Violet 19 (PV FAST RED E5B, produced by Clariant Co.)

C1: Pigment Blue 15:4 (CYANINE BLUE 4044, produced by Sanyo Color Works, Ltd.)

C2: Pigment Blue 15:4 (BLUE NO. 32, produced by Dainichiseika Color & Chemicals MFG. Co., Ltd.)

K1: Pigment Black 7 (MA7, produced by Mitsubishi Chemical Corp.)

K2: Pigment Black 7 (#52, produced by Mitsubishi Chemical Corp.)

(Dispersing Agents)

D1: SOLSPERSE 32000 (dispersing agent produced by Avicia Inc.)

D2: PB821 (dispersing agent, produced by Ajinomoto Fine Techno Co.)

D3: PB822 (dispersing agent, produced by Ajinomoto Fine Techno Co.)

D4: PB824 (dispersing agent, produced by Ajinomoto Fine Techno Co.)

D5: KF-1300M (dispersing agent, produced by Kawaken Fine Chemical Co., Ltd.)

D6: T-6000 (dispersing agent, produced by Kawaken Fine Chemical Co.)

D7: ED-251 (dispersing agent, produced by Kusumoto Chemicals, Ltd.)

D8: DISPERBYK 161 (dispersing agent, produced by Big Chemie Co.)(being a monomer)

MO1: tetraethylene glycol diacrylate (a bifunctional monomer)

MO2: OXT221 (oxetane compound, produced by TOAGOSEI Co., Ltd.)

<<Preparation of Ink Sets>>

By employing Pigment Dispersion Sets A-E, each colored ink composed as described in Tables 2-6 was prepared, whereby Ink Sets 1-5 were prepared. Each colored ink was filtered via a 3 μm TEFLON (registered trade name) membrane filter (produced by Advantec Co.) and then stored.

Further, viscosity characteristics ($S_{low}$, $S_{high}$, and $\Delta S$) of each ink prepared as above were determined employing viscoelasticity meter MCR300, produced by Physica Co. Tables 2-6 show the results.

$S_{low}$: viscosity (mPa·s) at a share rate of 11.7 l/s at 25° C.
$S_{high}$: viscosity (mPa·s) at a share rate of 1,000 l/s at 25° C.
$\Delta S$: $S_{low} - S_{high}$ (mPa·s)

TABLE 2

Ink set 1

| | | Ink type | | | |
|---|---|---|---|---|---|
| | | K | C | M | Y |
| Pigment Dispersion set | A | K Pigment 12.5 | C Pigment 12.5 | M Pigment 20.0 | Y Pigment 20.0 |
| Photo-polymerizable Compound | *1 | 26.5 | 27.5 | 9.0 | 4.0 |
| | *2 | 36.0 | 25.0 | 36.0 | 36.0 |
| | *3 | 20.0 | 30.0 | 30.0 | 35.0 |
| Photo-radical Initiator | I-819 | 2.5 | 2.5 | 2.5 | 2.5 |
| | I-184 | 2.5 | 2.5 | 2.5 | 2.5 |
| Ink viscosity (mPa·s) | $S_{low}$ | 22 | 28 | 34 | 41 |
| | $S_{high}$ | 20 | 27 | 31 | 38 |
| | $\Delta S$ | 2 | 1 | 3 | 3 |

TABLE 3

Ink set 2

| | | Ink type | | | |
|---|---|---|---|---|---|
| | | K | C | M | Y |
| Pigment Dispersion set | B | K Pigment 12.5 | C Pigment 12.5 | M Pigment 20.0 | Y Pigment 20.0 |
| Photo-polymerizable Compound | *1 | 25.4 | 26.4 | 7.9 | 2.9 |
| | *2 | 36.0 | 25.0 | 36.0 | 36.0 |
| | *4 | 20.0 | 30.0 | 30.0 | 35.0 |
| Modified Silicone Oil | SDX-1843 | 0.1 | 0.1 | 0.1 | 0.1 |
| Photo-radical | I-184 | 3.0 | 3.0 | 3.0 | 3.0 |

TABLE 3-continued

Ink set 2

| | | Ink type | | | |
|---|---|---|---|---|---|
| | | K | C | M | Y |
| Initiator | I-907 | 3.0 | 3.0 | 3.0 | 3.0 |
| Ink viscosity (mPa·s) | $S_{low}$ | 25 | 35 | 50 | 92 |
| | $S_{high}$ | 22 | 27 | 32 | 38 |
| | $\Delta S$ | 3 | 8 | 18 | 54 |

TABLE 4

Ink set 3

| | | Ink type | | | |
|---|---|---|---|---|---|
| | | K | C | M | Y |
| Pigment Dispersion set | C | K Pigment 12.5 | C Pigment 12.5 | M Pigment 17.5 | Y Pigment 12.5 |
| Photo-polymerizable Compound | V9040 | 3.0 | 3.0 | 3.0 | 3.0 |
| | EP-1 | 28.9 | 36.9 | 26.9 | 26.9 |
| | OXT-221 | 40.0 | 35.0 | 35.0 | 35.0 |
| | OXT-212 | 10.0 | 7.0 | 7.0 | 7.0 |
| Basic Compound | *A | 0.1 | 0.1 | 0.1 | 0.1 |
| Surface Active Agent | F178k | 0.02 | 0.02 | 0.02 | 0.02 |
| Modified Silicone Oil | KF-351 | 0.5 | 0.5 | 0.5 | 0.5 |
| Glycol ether | BDB | — | — | 5.0 | 10.0 |
| Photolytically Acid Generating Agent | UVI6992 | 5.0 | 5.0 | 5.0 | 5.0 |
| Ink viscosity (mPa·s) | $S_{low}$ | 32 | 42 | 50 | 82 |
| | $S_{high}$ | 28 | 30 | 32 | 33 |
| | $\Delta S$ | 4 | 12 | 18 | 49 |

TABLE 5

Ink set 4

| | | Ink type | | | |
|---|---|---|---|---|---|
| | | K | C | M | Y |
| Pigment Dispersion set | D | K Pigment 12.5 | C Pigment 12.5 | M Pigment 17.5 | Y Pigment 14.0 |
| Photo-polymerizable Compound | OXT-221 | 30.0 | 30.0 | 25.0 | 25.0 |
| | S2021P | 15.0 | 20.0 | 20.0 | 20.0 |
| | OXT-212 | 10.0 | 10.0 | 10.0 | 5.0 |
| | E-4030 | 12.3 | 12.3 | 7.3 | 10.8 |
| | S3000 | 15.0 | 10.0 | 10.0 | 10.0 |
| Basic Compound | *B | 0.1 | 0.1 | 0.1 | 0.1 |
| Modified Silicone Oil | KF-352 | 0.1 | 0.1 | 0.1 | 0.1 |
| Anisole | H-MB | — | — | 5.0 | 10.0 |
| Photolytically Acid Generating Agent | SP152 | 5.0 | 5.0 | 5.0 | 5.0 |
| Ink viscosity (mPa·s) | $S_{low}$ | 25 | 36 | 52 | 76 |
| | $S_{high}$ | 23 | 25 | 28 | 29 |
| | $\Delta S$ | 2 | 11 | 24 | 47 |

TABLE 6

Ink set 5

| | | Ink type | | | |
|---|---|---|---|---|---|
| | | K | C | M | Y |
| Pigment Dispersion set | E | K Pigment 12.5 | C Pigment 12.5 | M Pigment 17.5 | Y Pigment 20.0 |
| Photo-polymerizable Compound | OXT-221 | 45.0 | 45.0 | 40.0 | 35.0 |
| | EP-1 | 15.0 | 15.0 | 15.0 | 15.0 |
| | OXT-212 | 5.0 | 5.0 | 10.0 | 15.0 |
| | OXT-101 | 2.3 | 2.3 | 4.8 | 2.3 |
| | EP-2 | 15.0 | 15.0 | 7.5 | 7.5 |
| Basic Compound | *A | 0.1 | 0.1 | 0.1 | 0.1 |
| Modified Silicone Oil | XF42-334 | 0.1 | 0.1 | 0.1 | 0.1 |
| Photolytically Acid Generating Agent | DTS-102 | 5.0 | 5.0 | 5.0 | 5.0 |
| Ink viscosity (mPa·s) | $S_{low}$ | 30 | 40 | 60 | 86 |
| | $S_{high}$ | 28 | 29 | 33 | 36 |
| | ΔS | 2 | 11 | 27 | 50 |

Each compound abbreviated in Tables 2-6 is detailed below.

(Photopolymerizable Compounds)

*1: lauryl acrylate (monofunctional)

*2: tetraethylene glycol diacrylate (being bifunctional)

*3: trimethylolpropane triacrylate (being trifunctional)

*4: caprolactum modified dipentaerythritol hexaacrylate (being hexafunctional)

V9040: expoxidized linseed oil, VIKOFLEX 9040 (produced by ATOFINA Co.)

S2021P: alicyclic epoxy compound, CELLOXIDE 3000 (produced by Daicel Chemical Industries, Ltd.)

EP-1: alicyclic epoxy compound

EP-2: alicyclic epoxy compound

E-4030: expoxidized fatty acid butyrate, E-4030 (New Japan Chemical Co., Ltd.)

OXT-101: oxetane compound, OXT-101 (produced by TOA-GOSEI Co., Ltd.)

OXT-212: oxetane compound, OXT-212 (produced by TOA-GOSEI Co., Ltd.)

OXT-221: oxetane compound, OXT-222 (produced by TOA-GOSEI Co., Ltd.)

(Photo-Radical Initiators)

I-184: IRUGACURE 184 (produced by Ciba Specialty Chemicals, Ltd.)

I-819: IRUGACURE 819 (produced by Ciba Specialty Chemicals, Ltd.)

I-907: IRUGACURE 907 (produced by Ciba Specialty Chemicals, Ltd.)

(Basic Compounds)

*A: tri-iso-propanolamine

B: diethanolamine (Modified Silicone Oil)

SDX-1843: produced by Asahi Denka Kogyo Co.)

KF-351: produced by Shin-Etsu Silicones.

KF-352: produced by Shin-Etsu Silicones.

XF42-334: produced by CE Toshiba Silicone Co.

(High-Boiling Point Solvents)

BDB: glycol ether, HISOLV BDB (produced by Toho Chemical Industry Co., Ltd.)

H-MB: anisole, HICHEMIC MB (produced by Toho Chemical Industry Co. Ltd.)

(Photolytically Acid Generating Agents)

UV16992: produced by Dow Chemical Co.

SP152: produced by Asahi Denka Kogyo K.K.

(Surface Active Agent)

F178k: fluorine based nonionic surface active agent, F178k produced by Dainippon Ink and Chemicals, Inc.)

(Modified Silicone Oil)

KF-351: produced by Shin-Etsu Silicones

KF-352: produced by Shin-Etsu Silicones

EP-1

EP-2

<<Formation of Ink-Jet Images>>

Each of Ink Sets 1-5, prepared as above, was loaded in the ink-jet recording apparatus provided with a piezo type ink-jet nozzle, which was structured as described in FIG. 1. Subsequently, the following image recording was continuously conducted onto a long-length recording medium (at a width of 60 cm and a length of 500 m) described in Table 7.

After discharging yellow ink (Y) exhibiting maximum ΔS, magenta ink (M), cyan ink (C), and black ink (K) were sequentially ejected. After all the inks were deposited onto the recording medium, actinic radiation was exposed onto the ink to result in curing.

The ink feeding system was composed of an ink tank, a feeding pipe, a pre-chamber ink tank just prior to the head, and piping fitted with filters. The section from the pre-chamber tank to the head was subjected to heat insulation and heated to 50° C. The piezo head was driven so that multi-size dots of 2-15 pl were ejected at a resolution of 720×720 dpi (dpi represents the number of dots per inch or 2.54 cm). After deposition of ink droplets onto the recording medium, the resulting ink droplets were immediately (within one second after deposition) cured via the lamp unit located downstream in the recording medium conveying direction. Ink-jet images were formed at an ambience of 25° C. and 60% relative humidity.

and K colored inks. Subsequently, resulting characters were enlarged via a portable magnifying glass, and jaggedness of each character was evaluated based on the following criteria.

TABLE 7

| Image Sample No. | Ink set No. | Recording Medium | Exposure Condition | | | | | Remarks |
| | | | Exposure Radiation Source | Exposure Timing | Exposure Means | Peak wavelength (nm) | Maximum illuminance wavelength (Mw/cm²) | |
| --- | --- | --- | --- | --- | --- | --- | --- | --- |
| 1 | 1 | PET | A | *1 | C | 365 | 400 | Comp. |
| 2 | 1 | PVC | A | *1 | C | 365 | 400 | Comp. |
| 3 | 1 | art paper | A | *1 | C | 365 | 400 | Comp. |
| 4 | 2 | PET | A | *1 | C | 365 | 400 | Inv. |
| 5 | 2 | PVC | A | *1 | C | 365 | 400 | Inv. |
| 6 | 2 | art paper | A | *1 | C | 365 | 400 | Inv. |
| 7 | 3 | PET | B | *1 | C | 254 | 160 | Inv. |
| 8 | 3 | PVC | B | *1 | C | 254 | 160 | Inv. |
| 9 | 3 | art paper | B | *1 | C | 254 | 160 | Inv. |
| 10 | 4 | PET | B | *1 | C | 254 | 160 | Inv. |
| 11 | 4 | PVC | B | *1 | C | 254 | 160 | Inv. |
| 12 | 4 | art paper | B | *1 | C | 254 | 160 | Inv. |
| 13 | 5 | PET | B | *1 | C | 254 | 160 | Inv. |
| 14 | 5 | PVC | B | *1 | C | 254 | 160 | Inv. |
| 15 | 5 | art paper | B | *1 | C | 254 | 160 | Inv. |

*1: 0.1 second after deposition

Each of the items abbreviated in Table 7 will now be detailed.

<Recording Media>

PET: polyethylene terephthalate

PVC: polyvinyl chloride

<Exposure Radiation Sources>

Exposure Radiation Source A: high pressure mercury lamp (produced by Iwasaki Electric Co., Ltd.)

Exposure Radiation Source B: low pressure mercury lamp (customized product 200 W, produced by NIPPO Electric Co., Ltd.)

The maximum illuminance of each radiation source on the recording medium was represented via integrating illuminance at 254 nm or 365 nm which was determined employing UVPF-A1, produced by Iwasaki Electric Co., Ltd.

<Exposure Method>

Exposure Method C: Linear radiation was exposed downstream in the recording medium conveying direction.

<<Evaluation of Recording Images>>

With regard to each of the images recorded during the above image formation, the following evaluations were conducted at an output of 1 m, 50 m, and 100 m of each recording medium. Image quality and ejection stability was evaluated via the resulting image quality.

(Evaluation of Character Quality)

MS Ming style characters at a 6-point size were printed to realize the targeted density, employing each of the Y, M, C, and K colored inks. Subsequently, resulting characters were enlarged via a portable magnifying glass, and jaggedness of each character was evaluated based on the following criteria.

A: no jaggedness was noticed

B: slight jaggedness was noticed

C: jaggedness was noticed, but the characters were readable, resulting in the lowest level of commercial viability D: jaggedness was obvious, resulting in a level of no commercial viability due to blurred characters (Evaluation of Color Mixing (Bleeding))

Printing was conducted at 720 dpi (defined as above) so that dots of each of the Y, M, C, and K colors were adjacent to each other. Subsequently, each dot was enlarged via a potable magnifying glass, whereby the degree of bleeding was visually observed, and any resulting bleeding was evaluated based on the following criteria.

A: the shape of dots adjacent to each other maintained a perfect circle and no bleeding was noticed B: the shape of dots adjacent to each other maintained a Nearly perfect circle and bleeding was barely noticed C: dots adjacent to each other resulted in slight bleeding, whereby the shape of the dot was slightly modified, resulting in the lowest level of commercial viability D: dots adjacent to each other resulted in bleeding and mixing, resulting in a level of no commercial viability.

Table 8 shows the results.

TABLE 8

| Sample No. | 1 m | | 10 m | | 50 m | | 100 m | |
| | Character Quality | Color Mixing | Character Quality | Color Mixing | Character Quality | Color Mixing | Character Quality | Color Mixing |
| --- | --- | --- | --- | --- | --- | --- | --- | --- |
| 1 Comp. | B | B | C | C | D | D | D | D |
| 2 Comp. | B | B | C | C | D | D | D | D |

TABLE 8-continued

| | 1 m | | 10 m | | 50 m | | 100 m | |
|---|---|---|---|---|---|---|---|---|
| Sample No. | Character Quality | Color Mixing | Character Quality | Color Mixing | Character Quality | Color Mixing | Character Quality | Color Mixing |
| 3 Comp. | B | B | D | D | D | D | D | D |
| 4 Inv. | B | B | B | B | B | B | C | C |
| 5 Inv. | B | B | B | B | B | B | B | B |
| 6 Inv. | B | B | B | B | C | C | C | C |
| 7 Inv. | A | A | A | A | A | A | A | A |
| 8 Inv. | A | A | A | A | A | A | A | A |
| 9 Inv. | B | B | B | B | B | B | B | B |
| 10 Inv. | B | B | B | B | B | B | B | B |
| 11 Inv. | B | B | B | B | B | B | B | B |
| 12 Inv. | B | B | B | B | B | B | B | B |
| 13 Inv. | A | A | A | A | A | A | A | A |
| 14 Inv. | A | A | A | A | A | A | A | A |
| 15 Inv. | A | A | A | A | A | A | A | A |

As can clearly be seen from the results shown in Table 8, by employing the image forming method of the present invention, images which were highly detailed, exhibited excellent character quality, resulted in no color mixing, and were stably reproduced onto any of three types of recording media.

Example 2

Each of the ink sets, described in Example 1, was employed, and images were formed while changing the ejection order of each colored ink. The formed images were evaluated in the same manner as in Example 1. As a result, it was possible to confirm that effects of the present invention were further enhanced by initially discharging ink exhibiting maximum ΔS.

Further, images which were formed while appropriately changing the actinic radiation exposure initiation after ejection of each colored ink onto the recording medium were evaluated employing the same method as in Example 1. As a result, it was possible to confirm that by carrying out exposure of actinic radiation after all inks were deposited onto the recording medium, effects of the present invention were further enhanced.

Example 3

Images were formed employing each ink set described in Example 1 while appropriately changing the volume of ink droplets ejected from each nozzle of the ink-jet recording head. Subsequently, the formed images were evaluated for each of the above items, employing the same method as in Example 1. As a result, it was possible to confirm that effects of the present invention were further enhanced by discharging a volume of ink droplets within the range of 2-15 pl.

Further, images were formed by appropriately changing the heating temperature of the ink-jet ink and the recording head. Formed images were evaluated for each of the above items, employing the same method as in Example 1. As a result, it was possible to confirm that by carrying out ejection within the heating temperature range of the ink-jet ink and the recording head of 35-100° C., effects of the present invention were further enhanced.

The invention claimed is:

1. A method of producing an image comprising the steps of:

(a) ejecting droplets of at least two actinic radiation curable ink-jet inks from an ink-jet recording line head so as to deposit onto a recording medium; and (b) irradiating the deposited droplets of the actinic radiation curable ink-jet inks with actinic radiations, wherein the two actinic radiation curable ink-jet inks being different in hue with each other; and an absolute value of a difference of $\Delta S(S_{low}-S_{high})$ between the two ink-jet inks different in hue is 5-1,000 mPa·s, where $S_{low}$ represents a viscosity of the actinic radiation curable ink-jet ink measured with a share rate of 11.7 1/s at 25° C., $S_{high}$ represents a viscosity of the actinic radiation curable ink-jet ink measured with a share rate of 1,000 1/s at 25° C., and $\Delta S(S_{low}-S_{high})$ represents a difference between the viscosities of $S_{low}$ and $S_{high}$, wherein $\Delta S(S_{low}-S_{high})$ of the actinic radiation curable ink-jet ink firstly ejected and deposited on the recording medium is larger than $\Delta S(S_{low}-S_{high})$ of the actinic radiation curable ink-jet ink secondly ejected and deposited on the recording medium, provided the firstly ejected ink and the secondly ejected ink are different in hue.

2. The method of producing an image of claim 1, wherein irradiating the deposited droplets of the actinic radiation curable ink-jet inks with actinic radiations is carried out after all of the actinic radiation curable ink-jet inks are sequentially deposited on the recording medium.

3. The method of producing an image of claim 1, wherein $\Delta S_{high}$ of the actinic radiation curable ink-jet inks is 0-10 mPa·s, provided that $\Delta S_{high}$ is defined by a difference between viscosities ($S_{high}$) of the two actinic radiation curable ink-jet inks having different hues and measured with a share rate of 1,000 1/s at 25° C.

4. The method of producing an image of claim 1, wherein each of the ejected droplets of the actinic radiation curable ink-jet inks has a volume of 2-15 pl.

5. An ink-jet ink used for the method of producing an image of claim 1, comprising a photopolymerizable compound having an oxirane group in the molecule.

6. An ink-jet ink used for the method of producing an image of claim 1, comprising:

(a) a compound having an oxetane group in the molecule in an amount of 30-90 weight %;

(b) a compound having an oxirane group in the molecule in an amount of 5-70 weight %; and c) a vinyl ether-compound in an amount of 0-40 weight %.

7. An ink-jet recording apparatus employed in claim 1, comprising a device having a function to heat the actinic radiation curable ink-jet inks and the recording head in the range of 35-100° C. before ejecting the actinic radiation curable ink-jet inks from the ink-jet head.

* * * * *